USO05564823A

United States Patent [19]
Holik

[11] Patent Number: 5,564,823
[45] Date of Patent: Oct. 15, 1996

[54] METHOD AND APPARATUS FOR SEPARATION AND VOLUME MEASUREMENT OF COMPONENTS FOR LIGHTWEIGHT CONCRETE

[75] Inventor: Karl Holik, Litchfield Park, Ariz.

[73] Assignee: Rastra Technologies, Inc., Litchfield Park, Ariz.

[21] Appl. No.: 417,203

[22] Filed: Apr. 5, 1995

[51] Int. Cl.[6] .............................. B28C 5/00; B28C 7/04; B07B 1/00
[52] U.S. Cl. .................................. 366/6; 366/18; 366/19; 209/245; 209/239
[58] Field of Search .............................. 366/6, 8, 20, 16, 366/30, 18, 31, 19, 32, 33, 35, 38; 209/241, 245, 244, 257, 352, 239

[56] References Cited

U.S. PATENT DOCUMENTS

| | | | |
|---|---|---|---|
| 1,159,962 | 11/1915 | Lamb | 209/241 |
| 1,798,505 | 5/1931 | Straub | 366/6 |
| 3,587,858 | 6/1971 | Cristianson | 209/257 |
| 3,672,504 | 6/1972 | Grimes, Jr. | 209/257 |
| 3,997,434 | 12/1976 | Macauley, Jr. | 366/30 |
| 4,092,737 | 5/1978 | Sandel | 366/31 |
| 4,895,450 | 1/1990 | Holik | 366/18 |

*Primary Examiner*—Frankie L. Stinson
*Assistant Examiner*—Tony G. Soohoo
*Attorney, Agent, or Firm*—Sandra L. Etherton

[57] ABSTRACT

A method and apparatus to simplify the measurement of lightweight concrete components and to recycle waste materials that result from lightweight concrete block manufacture. The method involves separating coarse and fine components of the waste. The apparatus uses several devices, separately or in combination, to separate the components, such as a sieve, auger, and blower. The coarse components are conveyed by auger, gravity or other means to be measured by weight in a first hopper. The fine components are conveyed by gravity, blower, auger or other means to be measured by volume in a second hopper. Fresh materials may be added to both hoppers. The materials from both hoppers are then mixed together in a primary mixing chamber and finally conveyed into molds for curing before use.

20 Claims, 3 Drawing Sheets

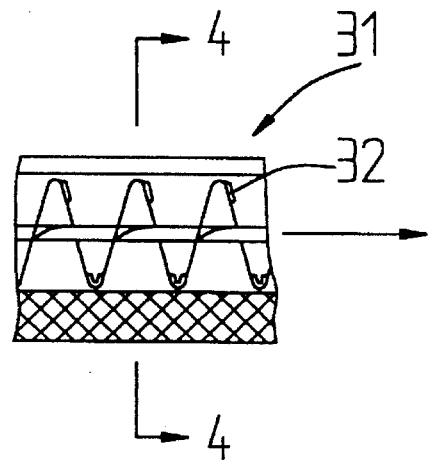
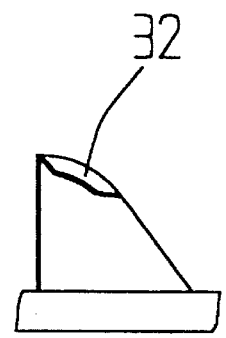
Fig. 3   Fig. 4
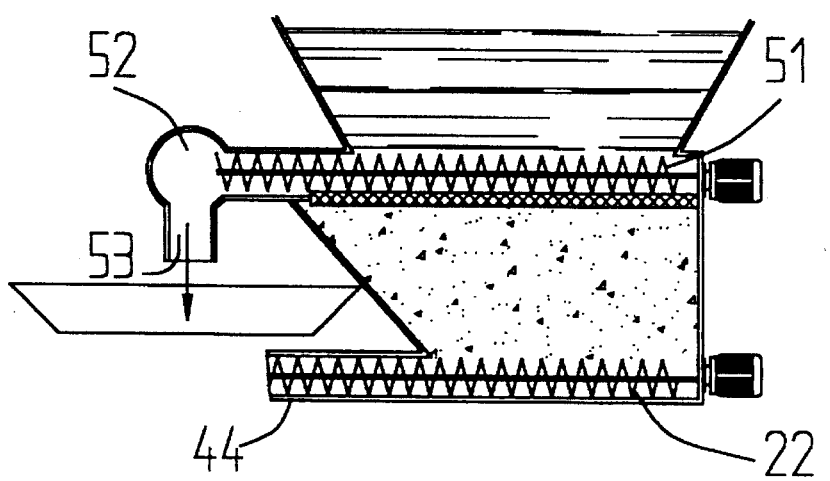
Fig. 5

METHOD AND APPARATUS FOR SEPARATION AND VOLUME MEASUREMENT OF COMPONENTS FOR LIGHTWEIGHT CONCRETE

BACKGROUND OF THE INVENTION

This invention relates generally to cement mixing, and more particularly to separating, measuring and mixing an admixture of components for lightweight cement. Recycled lightweight concrete waste materials may hereby be recycled. This method and apparatus is an improvement of the existing process described in my U.S. Pat. No. 4,895,450, incorporated herein by reference.

Lightweight concrete consists mainly of cement, water, and an admixture of lightweight filler, the filler comprising such materials as polystyrene, crushed pumice, and perlite. Lightweight concrete blocks are formed from this cementious mixture by pouring the mixture into block forms, allowing the cement to cure, and cutting the blocks to the desired shape. Waste material is created when the blocks are cut, the waste comprising hydrated cement dust, lightweight filler, and concrete lumps. Because the residual cement has already been hydrated, the waste materials will no longer bind without additional binders. The waste material may be recycled, however, by adding it to a fresh mixture of lightweight cement, which will bind with the waste material.

The prior art process is described in detail in U.S. Pat. No. 4,895,450, hereinafter the '450 patent. That process greatly simplified the measuring of the various ingredients by providing two different chambers into which the ingredients are placed. In a first hopper, filler material contained in hydrated cement and fresh filler material are measured by volume, and the hydrated cement is measured by weight. In a second hopper, water and cement are measured by weight.

Before recycling residual lightweight concrete, it is necessary to separate the components of the waste materials. This involves separating the dust and lightweight filler from the heavier concrete lumps. Furthermore, lightweight filler particles that have adhered to the concrete lumps should be removed. Because the ratios of cement, water, and lightweight filler must be kept within narrow tolerances, all the components must be measured separately. This further complicates the process of making lightweight cement.

Therefore, it is an object of this invention to provide a method and apparatus to use recycled lightweight concrete waste materials to produce lightweight concrete. It is a further object to provide a method and apparatus to separate and measure the waste materials. It is another object of this invention to simplify making lightweight cement blocks by providing a method and apparatus that separates ingredients into a first hopper for weighing materials and a second hopper for volume measuring materials.

BRIEF SUMMARY OF THE INVENTION

This invention is a method and apparatus to simplify the measurement of lightweight concrete components and to recycle waste materials that result from lightweight concrete block manufacture. The method involves separating coarse and fine components of the waste. The apparatus uses several devices, separately or in combination, to separate the components, such as a sieve, auger, and blower. The coarse components are conveyed by auger, gravity or other means to be measured by weight in a first hopper. The fine components are conveyed by gravity, blower, auger or other means to be measured by volume in a second hopper. Fresh materials may be added to both hoppers. The materials from both hoppers are then mixed together in a primary mixing chamber and finally conveyed into molds for curing before use.

BRIEF DESCRIPTION OF THE DRAWINGS

FIG. 3 is a cross-section of an alternative screw blade along the auger's longitudinal axis.

FIG. 4 is cross-section of the alternative screw blade along line 4—4 of FIG. 4.

FIG. 5 is a schematic illustration of an alternative embodiment of the present invention.

DESCRIPTION OF THE PREFERRED EMBODIMENTS

Please refer to the accompanying FIGS. 1–5 where like numerals refer to like parts throughout the drawings. Lightweight concrete waste materials are best separated into two components: coarse particles comprising, in major part, filler material, and fine particles comprising, in major part, cement dust. Coarse particles may also be an aggregate of filler material adhered to cement lumps. The filler material may be broken apart from the cement lumps by use of a crushing device, such as an auger with a specialized crushing blade. FIGS. 3 and 4 illustrate this alternative blade in which small pieces of metal are attached to the edges of the screw, positioned in an angle towards the direction of the material flow. By this design, the lightweight filler material beads are wedged and more friction is applied to them during the travel along the auger and over the sieve. Alternatively, the recycled material may be crushed prior to being fed into the receiving means by a jaw crusher, roller crusher, ball mill or the like.

Figure 1:
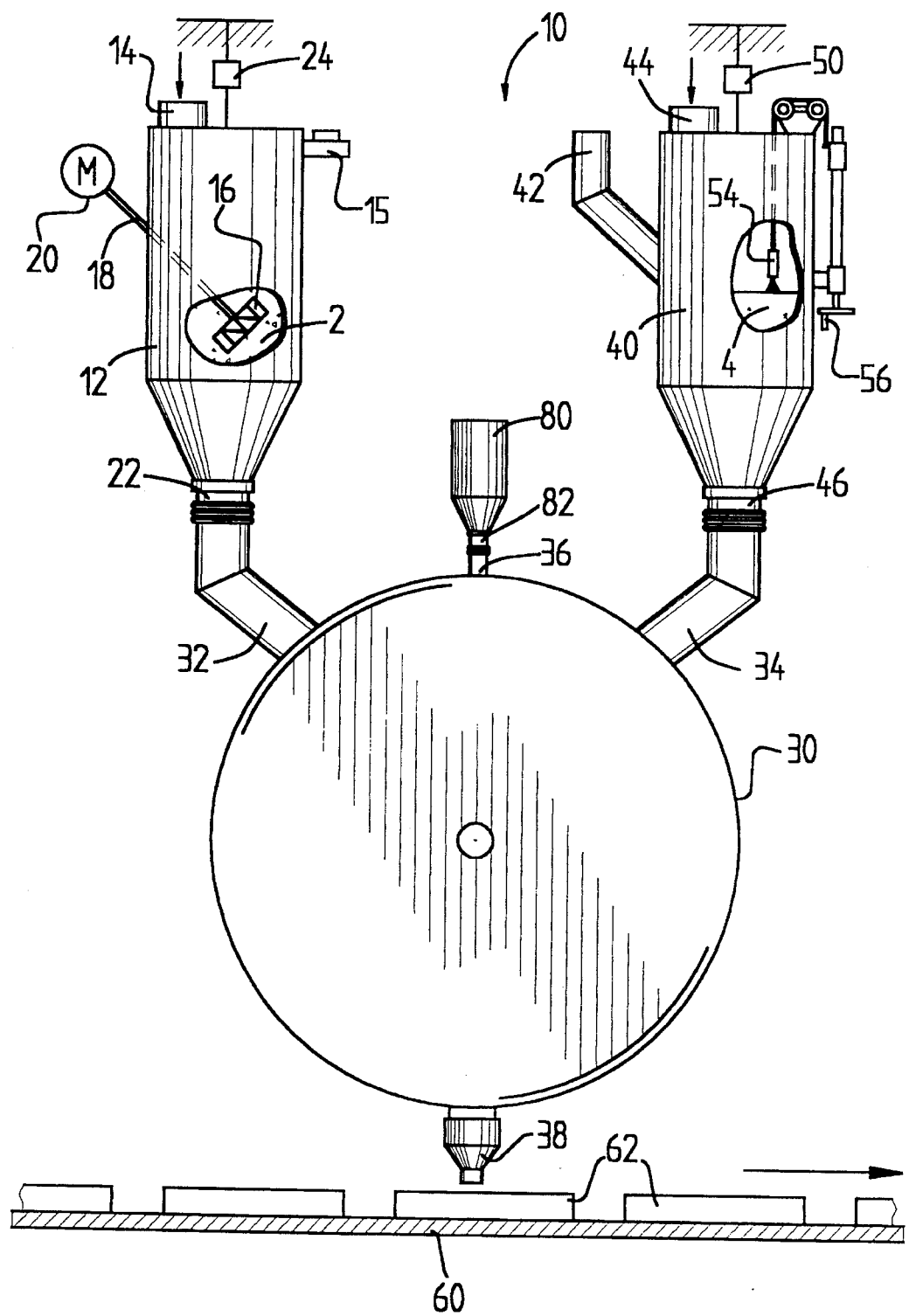
FIG. 1 is a schematic illustration of the apparatus of the prior art.
Figure 2:
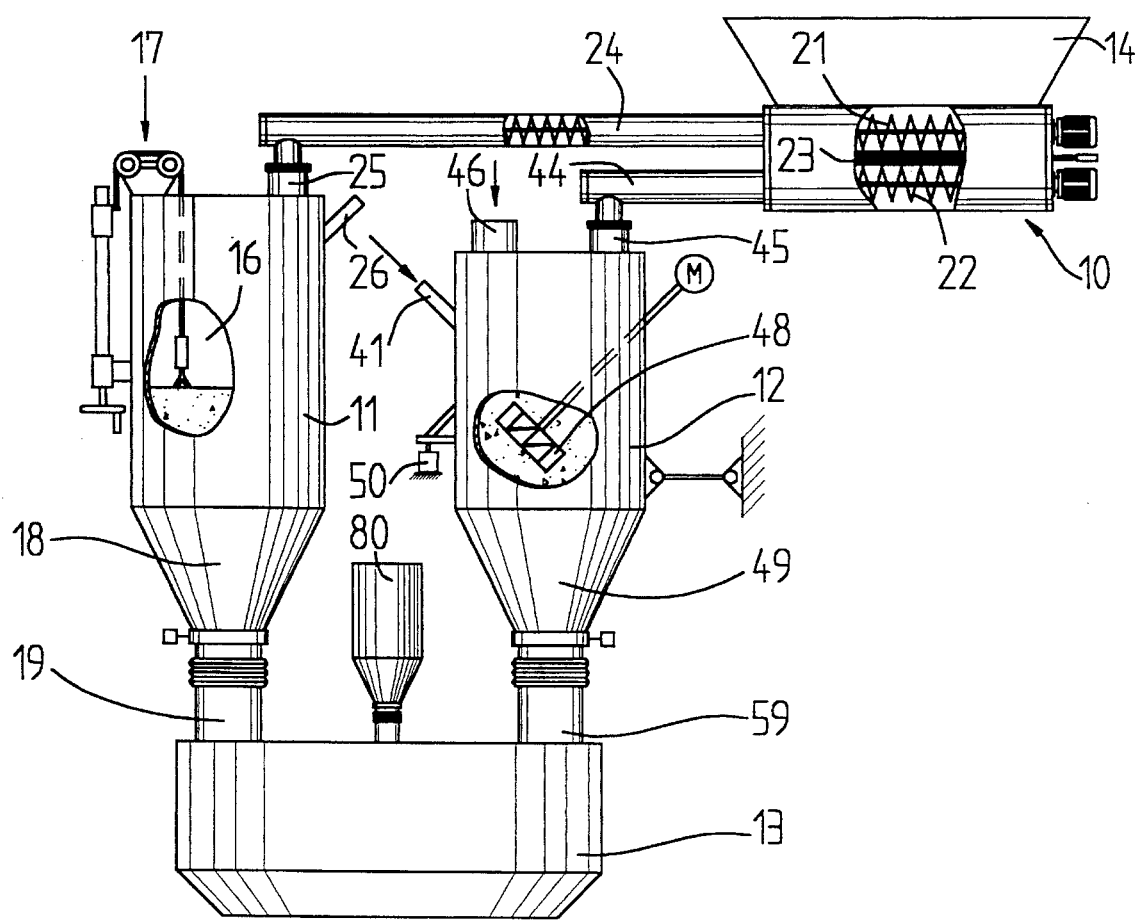
FIG. 2 is schematic illustration of the apparatus of the present invention.

FIG. 1 illustrates the prior art. FIG. 2 is a schematic illustration of the apparatus of the present invention, including a separating means 10, a first mixing chamber or hopper 11, a second mixing chamber or hopper 12, and a primary mixing chamber or hopper 13. The output from both the first hopper 11 and the second hopper 12 flow into the primary mixing chamber 13.

Recycled lightweight concrete waste materials are fed into the separating means through a conduit, bin 14 or the like. The separating means comprises means for separating the waste materials into coarse and fine components, means for conveying the coarse materials to the first hopper, and means for conveying the fine materials into the second hopper.

In the preferred embodiment as shown in FIG. 2, the waste materials are conveyed by augers 21, 22 into the first hopper 11 and second hopper 12, respectively. Alternatively, a simple conveyor or other means may be employed. The materials are conveyed over a screen or sieve 23 of desired mesh size to be separated into various sizes of particles. For separation of more than two sizes of particles multiple sieves may be used. To facilitate separation, a vibrating sieve may be used.

Coarse material is conveyed to the first hopper 11 through a conduit 24. Conveyance may be achieved by auger, belt or, because the coarse material is lightweight filler material, by blowing the particles through a conduit into the first hopper.

In order to have flexibility in using the recycled materials, there may be a container between the separator and the first hopper to buffer a certain amount of the filler (not shown). Coarse material is added to the first hopper 11 through an input spout 25.

The first hopper has a second input spout 26 through which new filler material may added to the hopper, if desired. A level sensor 16 or other means for measuring the volume of the materials in the first hopper is disposed in the first hopper. The level sensor 16 may be connected to a level adjustment drive 17, thus making is possible to predetermine a certain volume. An output conduit 18 is connected near the lower portion of the first hopper to an input conduit 19 of the primary mixing chamber.

Fine material is conveyed to the second hopper through a conduit. Conveyance may be achieved by auger, belt or gravity. In order to have flexibility in using the recycled materials, there may be a container between the separator and the second hopper to buffer a certain amount of the fine material (not shown). Fine material is added to the second hopper 12 through an input spout 45.

The second hopper has an additional input spout 46. Both water and cement flow into the second hopper and chamber through the input spout 46. Alternatively, water may be filled by means of a nozzle arrangement inside the second hopper through a water connection 41. A mixer 48 is disposed in the second hopper for mixing the water and cement. A scale 50, weight cell, or other weighing means is connected to the second hopper to weigh the materials in the hopper, namely water, cement and fine recycled material. An output conduit 49 is connected near the lower portion of the second hopper 12 to an input conduit 59 of the primary mixing chamber.

FIG. 5 illustrates an alternative embodiment of separation apparatus. The upper auger 51 conveys coarse material into a pipe 52 running at angle, preferably perpendicular, to the screw. FIG. 5 shows pipe 52 in cross-section, at a right angle to the screw and parallel to the ground. An air stream from a blower picks up the lightweight filler material and conveys it to the first hopper 11. An opening 53 in the pipe allows heavy lumps to drop by gravity out of the conduit, thereby preventing unwanted heavy aggregates of cement and filler from being recycled. FIG. 5 shows the opening in the elbow where pipe 52 meets the screw. Fine material is conveyed to the second hopper 12 by an auger 22 and conduit 44.

The output from the first and second hoppers flows into the primary mixing chamber 13 and is mixed. Additives such as foaming agents, bonding agents and the like may be added to the primary chamber input conduit 80.

The objects of this invention are achieved through the aforementioned improvements. Although certain preferred embodiments have been shown and described, it should be understood that other embodiments and modifications that achieve these objects may be apparent to those of skill in the art and are within the scope of the appended claims.

I claim:

1. A method for separating components of lightweight concrete waste material comprising the steps of:
    a) feeding lightweight concrete waste material into a separating means;
    b) separating the components of the waste material with at least one sieve into coarse and fine waste components;
    c) conveying the coarse waste components to a first hopper;
    d) measuring the volume of the coarse waste components;
    e) conveying the fine waste components to a second hopper;
    f) weighing the fine waste components.

2. A method according to claim 1 wherein the step of separating further comprises conveying the waste material over the sieve with an auger.

3. A method according to claim 1 wherein the step of separating further comprises vibrating at least one sieve.

4. A method according to claim 1 wherein the step of conveying the fine waste components comprises moving the fine waste components with air flow from a blower.

5. A method for recycling components of lightweight concrete comprising the steps of:
    a) feeding lightweight concrete waste material into a separating means;
    b) separating the components of the waste material into coarse and fine components;
    c) conveying the coarse waste components to a first hopper;
    d) conveying water and cement to the first hopper;
    e) weighing the coarse waste components, water and cement;
    f) conveying water, cement, and the coarse waste components to a primary mixing chamber;
    g) conveying the fine waste components to a second hopper;
    h) measuring the volume of the fine waste components;
    i) conveying the fine waste components to the primary mixing chamber;
    j) mixing the coarse and fine waste components in the primary mixing chamber.

6. The method of claim 5 wherein separating the components of the lightweight concrete waste material further comprises the step of feeding the concrete waste material into a separating means with an auger.

7. The method of claim 5 wherein separating the components of the lightweight concrete waste material further comprises the step of feeding the concrete waste material into a separating means of at least one sieve.

8. The method of claim 7 wherein separating the components of the lightweight concrete waste material further comprises vibrating the sieve with a vibrator.

9. The method of claim 5 wherein conveying the fine waste components to a second hopper further comprises moving the fine waste components with air flow from a blower.

10. The method of claim 5 further comprising the step of feeding fresh filler material into the second hopper.

11. An apparatus for separating components of lightweight concrete waste material comprising:
    a) a first hopper;
    b) a second hopper;
    c) at least one sieve for separating the components of the waste material with into coarse and fine waste component;
    d) a means for conveying the coarse waste components to a first hopper;
    e) a means for measuring the volume of the coarse waste components;
    f) a means for conveying the fine waste components to a second hopper;
    g) a means for weighing the fine waste components.

12. An apparatus according to claim 11 wherein a means for conveying the fine waste material is an auger.

13. An apparatus according to claim 11 wherein a means for conveying the coarse waste material is an auger.

14. An apparatus according to claim 11 wherein the means of conveying the fine waste components comprises is air flow from a blower.

15. An apparatus for recycling lightweight concrete waste materials comprising:
   a) a first hopper;
   b) a second hopper;
   c) a primary mixing chamber;
   d) a means for conveying lightweight concrete waste materials to a separating means;
   e) the separating means, wherein lightweight concrete waste materials are separated into coarse and fine components;
   f) a means for conveying the coarse components to the first hopper;
   g) a means for conveying water and cement to the first hopper;
   h) a weighing means for weighing the coarse components, water, and cement in the first hopper;
   i) a means for conveying the fine components to the second hopper;
   j) a means for measuring the volume of the fine components;
   k) a means for conveying water, cement, and the coarse components to the primary mixing chamber;
   l) a means for conveying the fine components to the primary mixing chamber;
   m) a means for mixing the coarse and fine waste components in the primary mixing chamber.

16. An apparatus according to claim 15 wherein the means for conveying lightweight concrete waste materials is an auger.

17. An apparatus according to claim 15 wherein the separating means comprises at least one sieve.

18. An apparatus according to claim 17 wherein the apparatus further comprises a vibrator to vibrate the sieve.

19. An apparatus according to claim 15 further comprising a means for introducing fresh lightweight filler material to the second hopper.

20. An apparatus according to claim 15 in which the primary mixing chamber further includes additive hopper means connected to the primary mixing chamber for providing additives to the primary mixing chamber for the materials being mixed.

* * * * *